United States Patent Office 3,127,263
Patented Mar. 31, 1964

3,127,263
METHOD FOR THE CONTROL OF WEEDS
Rayner S. Johnson, Wilmington, Del., assignor to E. I. du Pont de Nemours and Company, Wilmington, Del., a corporation of Delaware
No Drawing. Filed Oct. 20, 1961, Ser. No. 146,452
1 Claim. (Cl. 71—2.6)

This invention relates to herbicidal compositions and methods employing 1-methoxy-1-methyl-3-phenylurea of the formula:

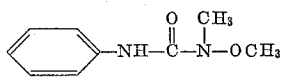

This compound is known and its preparation is disclosed in the literature in the Journal of the American Chemical Society, vol. 49, at page 1538 (1927).

According to the present invention, it has been found that the compound of the formula above possesses uniquely outstanding herbicidal activity. The compound is particularly effective as a pre-emergence herbicide. It has been found unexpectedly that this compound is not adsorbed strongly by soil and thus is highly advantageous in that this property facilitates its penetration of soil and take-up by deep-rooted plants. Soil penetration is further facilitated by its relatively high solubility in both water and oils.

Herbicidal compositions of the invention are prepared by admixing the substituted urea, in a herbicidally effective amount, with a conditioning agent of the kind used and referred to in the art as a pest control adjuvant or modifier to provide formulations adapted for ready and efficient application to soil or weeds (i.e., unwanted plants) using conventional applicator equipment.

Thus the herbicidal compositions or formulations are prepared in the form of solids or liquids. Solid compositions are preferably in the form of dusts and are compounded to give homogeneous free-flowing dusts by admixing the active compound with finely-divided solids, preferably talcs, natural clays, pyrophyllite, diatomaceous earth or flours such as walnut shell, wheat, redwood, soya bean, cottonseed flours and other inert solid conditioning agents or carriers of the kind conventionally employed in preparing pest control compositions in dust or powder form.

Liquid compositions of the invention are prepared in the usual way by admixing the substituted urea with a suitable liquid diluent media. With certain solvents such as alkylated naphthalene, dimethylformamide and cresol, relatively high, up to about 35% by weight or more, concentrations of the active urea compound can be obtained in solution. Other liquids conventionally used in preparing liquid herbicidal compositions are for the most part less effective solvents.

The herbicidal compositions of the invention whether in the form of dusts or liquids preferably also include a surface-active agent of the kind sometimes referred to in the art as a wetting, dispersing or emulsifying agent. These agents which will be referred to hereinafter more simply as surface-active dispersing agents cause the compositions to be easily dispersed in water to give aqueous sprays which for the most part constitute a desirable composition for application.

The surface-active agents employed can be of the anionic, cationic or nonionic type and include, for example, sodium and potassium oleate, the amine salts of oleic acids such as morpholine and dimethylamine oleates, the sulfonated animal and vegetable oils such as sulfonated fish and castor oils, sulfonated petroleum oils, sulfonated acyclic hydrocarbons, sodium salt of lignin sulfonic acid (goulac), alkyl naphthalene sodium sulfonate and other wetting, dispersing and emulsifying agents such as those listed in detail in an article by McCutcheon in "Soap and Chemical Specialties," volume 31, Nos. 7–10 (1955).

Generally the surface-active agent will not comprise more than about 5 to 15% by weight of the composition depending, of course, upon the particular surface-active agent, the system in which it is placed, and the result desired, and in certain compositions, the percentage will be 1% or less. Usually the minimum lower concentration will be 0.1%.

The herbicidal compositions are applied either as a spray or a dust to the locus or area to be protected from undesirable plant growth, commonly called weeds, i.e., plants growing where they are not wanted. Such application can be made directly upon the locus or area and the weeds thereon during the period of weed infestation in order to destroy the weeds but, if desired, the application can be made in advance of an anticipated weed infestation to prevent such infestation. Thus the compositions can be applied as aqueous foliar sprays and can also be applied as sprays directly to the surface of the soil. Alternatively, the dried powder compositions can be dusted directly on the plants or on the soil.

The active compound is, of course, applied in amount sufficient to exert the desired herbicidal action. The amount of the active substituted urea present in the compositions as actually applied for destroying, preventing, or controlling weeds will vary with the manner of application, the particular weeds for which control is sought, the purposes for which the application is being made, and like variables. In general, the herbicidal compositions as applied in the form of a spray or a dust will contain from about 0.5% to 85% by weight of substituted urea.

Fertilizer materials, other herbicidal agents, and other pest control agents such as insecticides and fungicides can be included in the herbicidal compositions of the invention if desired.

In order that the invention may be better understood, the following examples are given in addition to the examples already given above. The examples illustrate herbicidal formulations and herbicidal applications according to this invention, and the results obtained. The numbers following the tabulated ingredients represent parts by weight of the ingredients in the respective compositions.

Example 1

1-methoxy-1-methyl-3-phenylurea is formulated into a water-dispersible powder by intimately mixing the ingredients listed below with conventional mixing equipment and then grinding the mixture to give a powder having an average particle size less than about 50 microns.

1-methoxy-1-methyl-3-phenylurea _____ 75.00
Fuller's earth _____ 23.75
Sodium lauryl sulfate, 50% (wetting agent) _____ 1.00
Methyl cellulose, 15 cps. (dispersing agent) _____ 0.25

The resulting formulation is then diluted with water (15 lb./100 gallons) and applied at the rate of 45 lbs./acre (active) with a tractor mounted sprayer. This treatment gives excellent control of deep-rooted perennial weeds, such as leafy spurge and bindweed.

The above formulation also is applied pre-emergence at the rate of ½ to 1 lb./acre (active) in 30 gallons water to a newly planted field of carrots. This application gives excellent pre-emergence control of volunteer tame mustard, wild mustard and pigweed. The carrots show no adverse growth effects.

Example 2

1-methoxy-1-methyl-3-phenylurea may be formulated into dust compositions. A typical dust composition is prepared by blending or mixing the ingredients shown below and grinding the mix to give a composition having an average particle size less than about 50 microns.

| 1-methoxy-1-methyl-3-phenylurea | 5 |
|---|---|
| Talc | 95 |

This dust composition is used at the rate of 20 lbs./acre (active) for the control of vegetation growing around power transformers, telephone poles and highway markers. Excellent control of a general infestation of annual broadleaf and grass species such as pigweed, lamb's-quarters, foxtail and crabgrass is obtained.

*Example 3*

| 1-methoxy-1-methyl-3-phenylurea | 4 |
|---|---|
| Granular attapulgite | 96 |

The above granular product is prepared by tumbling the attapulgite granules in a drum while spraying on a solution of the urea in acetone, then removing the acetone with heat.

This formulation has excellent utility for the control of deep-rooted perennial weeds, when applied with an adapted tractor spreader at the rate of 45 lbs./acre of active ingredient. Good control of field bindweed, leafy spurge, quackgrass and nutsedge is obtained.

This formulation is applied easily to weeds growing along railroad rights-of-way. Twenty lbs./acre (active) gives excellent control of crabgrass, foxtail, barnyard grass, ragweed, and goldenrod.

*Example 4*

| 1-methoxy-1-methyl-3-phenylurea | 25 |
|---|---|
| Anhydrous sodium sulfate | 10 |
| Alkyl naphthalene sulfonic acid, Na salt | 1 |
| Ca, Mg, bentonite | 64 |

The finely divided components are first blended, then moistened with water and extruded to form pellets and dried.

This formulation gives excellent control of brush species. Rates of 25 lbs./acre of the formulation gives excellent control of oak and winged elm in pastures. Sixty lbs./acre of the formulation gives control of maple, ash, willow, privet and poplar growing in fence rows.

*Example 5*

1-methoxy-1-methyl-3-phenylurea is formulated into emulsifiable oil compositions of the type illustrated below by dissolving the urea and the conditioning agents in the organic diluent.

| 1-methoxy-1-methyl-3-phenylurea | 15 |
|---|---|
| Xylene | 80 |
| Alkyl aryl polyether alcohol | 5 |

This emulsifiable oil is mixed in 100 gallons of water at the site of spraying. When applied at the rate of 30 lbs./acre (active) on ditch banks, excellent control of quackgrass, crabgrass, foxtail, downy bromegrass, ragweed, pigweed and purslane is obtained.

*Example 6*

1-methoxy-1-methyl-3-phenylurea is dissolved in "Lion Herbicidal Oil No. 6" (1 lb./15 gallons of oil) and applied with a railroad spray car at the rate of 15 lbs. of active ingredient along railroad rights-of-way. Good control of wild mustard, peppergrass, morning glory, jimsonweed, cockleburr, crabgrass and seedling Johnson grass is obtained.

This application is a continuation-in-part of my copending application Serial No. 775,102, filed November 20, 1958, now abandoned.

The invention claimed is:

A method for the control of weeds which comprises applying to a locus to be protected, in an amount sufficient to exert a herbicidal action, the compound 1-methoxy-1-methyl-3-phenylurea.

References Cited in the file of this patent
UNITED STATES PATENTS

| 2,655,447 | Todd | Oct. 13, 1953 |
|---|---|---|
| 2,876,088 | Hill et al. | Mar. 3, 1959 |
| 2,960,534 | Scherer et al. | Nov. 15, 1960 |

OTHER REFERENCES

Jones et al.: in "J. Amer. Chem. Soc.," vol. 49, 1927, page 1538.